(12) United States Patent
Asche et al.

(10) Patent No.: US 6,431,299 B1
(45) Date of Patent: Aug. 13, 2002

(54) COOLING AIR DUCTING FOR EXCAVATOR

(75) Inventors: Jason J. Asche; William H. Curl, both of Bismarck, ND (US)

(73) Assignee: Clark Equipment Company, Woodcliffe Lake, NJ (US)

( * ) Notice: Subject to any disclaimer, the term of this patent is extended or adjusted under 35 U.S.C. 154(b) by 0 days.

(21) Appl. No.: 09/543,187

(22) Filed: Apr. 5, 2000

(51) Int. Cl.$^7$ ............................ B60K 11/04; B60K 11/06
(52) U.S. Cl. ................................... 180/68.1; 180/68.4
(58) Field of Search ............................. 180/68.1, 68.2, 180/68.3, 68.4, 68.6, 69.22, 69.2; 123/41.49, 41.48, 41.56, 41.31, 41.33, 41.01

(56) References Cited

U.S. PATENT DOCUMENTS

| | | | |
|---|---|---|---|
| 2,634,713 A | 4/1953 | Bartch et al. | 123/41.49 |
| 3,147,814 A | 9/1964 | Suhre | 180/54 |
| 3,404,732 A | 10/1968 | Mork | 165/51 |
| 3,555,846 A | 1/1971 | Harbeck et al. | 62/244 |
| 3,670,808 A | 6/1972 | Wait, Jr. | 165/42 |
| 3,762,489 A | 10/1973 | Proksch et al. | 180/69 |
| 3,809,151 A | 5/1974 | Scheidel et al. | 181/33 |
| 3,908,900 A | 9/1975 | Smith | 237/12.3 |
| 3,960,238 A | 6/1976 | McClure et al. | 181/33 |
| 4,081,050 A | 3/1978 | Hennessey et al. | 180/64 |
| 4,267,895 A | 5/1981 | Eggert et al. | 180/54 |
| 4,344,356 A | 8/1982 | Casterton et al. | 98/2.11 |
| 4,365,541 A | 12/1982 | Marques et al. | 98/2.11 |
| 4,499,865 A | 2/1985 | Charles | 123/41.05 |
| 4,531,453 A | 7/1985 | Warman et al. | 98/2.11 |
| 4,606,422 A | 8/1986 | Jewett | 180/68.1 |
| 4,612,975 A | 9/1986 | Ikari | 165/43 |
| 4,706,615 A * | 11/1987 | Scadding | 123/41.49 |
| 4,726,326 A | 2/1988 | Charles et al. | 123/41.49 |
| 4,805,747 A * | 2/1989 | Moedinger et al. | 180/68.1 |
| 4,815,550 A | 3/1989 | Mather et al. | 180/68.1 |
| 4,874,036 A | 10/1989 | Masuda | 165/42 |
| 4,938,303 A * | 7/1990 | Schaal et al. | 180/68.1 |
| 4,989,500 A | 2/1991 | Anliker et al. | 98/211 |
| 4,995,447 A * | 2/1991 | Weidmann et al. | 180/68.1 |
| 5,042,602 A | 8/1991 | Nakatani et al. | 180/68.1 |
| 5,085,269 A | 2/1992 | Aoki | 165/43 |
| 5,119,718 A | 6/1992 | Wagner et al. | 454/158 |
| 5,174,406 A * | 12/1992 | Lee | 180/68.1 |
| 5,193,608 A * | 3/1993 | Sekine et al. | 180/68.4 |
| 5,308,279 A | 5/1994 | Grinberg | 454/139 |
| 5,526,872 A * | 6/1996 | Gielda et al. | 180/68.1 |
| 5,551,505 A * | 9/1996 | Freeland | 180/68.1 |
| 5,660,243 A * | 8/1997 | Anzalone et al. | 180/68.1 |
| 5,689,953 A | 11/1997 | Yamashita et al. | 60/316 |
| 5,794,733 A * | 8/1998 | Stosel et al. | 180/68.1 |
| 5,857,350 A | 1/1999 | Johnson et al. | 62/314 |
| 5,885,152 A * | 3/1999 | Wardlaw | 454/121 |
| 5,887,671 A * | 3/1999 | Yuki et al. | 180/68.4 |
| 5,908,011 A * | 6/1999 | Stauffer et al. | 123/41.01 |
| 6,035,955 A * | 3/2000 | Suzuki et al. | 180/68.1 |
| 6,129,056 A * | 10/2000 | Seeki | 180/68.1 |
| 6,142,213 A * | 11/2000 | Gallivan et al. | 180/68.4 |
| 6,202,777 B1 * | 3/2001 | Surridge | 180/69.2 |

* cited by examiner

Primary Examiner—Lanna Mai
Assistant Examiner—Hau Phan
(74) Attorney, Agent, or Firm—Westman, Champlin & Kelly, P.A.

(57) ABSTRACT

An excavator has an operator's cab with an engine compartment at the rear which has a laterally facing opening for receiving cooling air that is drawn by an engine fan through a radiator. A duct is provided for transmitting cooling air from an inlet opening in the duct remote from the engine compartment opening. The engine compartment opening faces a wall of the duct so that the sound waves from the engine compartment must be deflected at an angle before reaching the inlet air opening. The duct causes the inlet air to turn substantially 90° as it flows from the air inlet opening in order to pass through the radiator at the engine compartment opening.

4 Claims, 5 Drawing Sheets

COOLING AIR DUCTING FOR EXCAVATOR

BACKGROUND OF THE INVENTION

The present invention relates to ducting of cooling air to a radiator or heat exchanger for the engine and hydraulic system of an excavator that changes the flow of inlet cooling air to the radiator to reduce noise from the engine at the exterior of an excavator cab.

It is common in power equipment to have the cooling air inlet into the engine directly aligned with the radiator or heat exchanger used for cooling the coolant of an internal combustion engine, and also for cooling hydraulic oil used for operating components. In small excavators, in particular this opening that is close to the engine compartment. This tends to raise the level of ambient noise in the cab and outside of the excavator cab during operation.

Various sound attenuating engine enclosures have been advanced, such as those shown in U.S. Pat. Nos. 3,762,489 and 3,960,238, where insulation layers or baffles are used in connection with attenuating material to reduce engine noise.

An efficient flow pattern for cooling air is shown in U.S. Pat. No. 4,815,550, in connection with a skid steer loader.

The present ducting system arranges the incoming air intakes and ducting on the rotating platform of an excavator to provide adequate airflow and to reduce exterior noise.

SUMMARY OF THE INVENTION

The present invention relates to an inlet air duct for an engine powered machine that is positioned so that the air inlet is at a location remote from the engine compartment. The opening at the engine compartment wall to the heat exchanger or radiator for the engine is not directly open on a straight path to the outside, but is through a duct that causes the airflow to change direction as it enters the radiator. This provides a solid wall facing the opening to the engine compartment, so that sound generated by the engine and engine cooling air fan or blower does not pass directly to the exterior and is also reduced in the operator cab. The opening or openings for the inlet air then can be facing in directions that are not adjacent the sides of the machine cab, and can be facing in directions that are not normally in line with persons standing near the excavator, and are more remote from an operator as well.

Specifically, on an excavator, which is shown in the specification, the engine is mounted in a housing at the rear portion of the operator cab structure. The operator's compartment is at a forward portion and is separated from the engine compartment by a wall. The inlet air duct is positioned to open to the normal laterally facing opening leading to the heat exchanger or radiator, and engine compartment but it extends along the side of the cab to a remote inlet opening that preferably faces either forwardly toward the boom, or downwardly to face toward the support frame or tracks of the excavator so that the air inlet openings do not directly emit sound waves toward areas where people would normally stand.

The ducts are formed to provide for a smooth flow of air so that adequate cooling air is provided by the fan. Not only is engine noise reduced but fan noise is also reduced in that the opening that the fan faces is a solid wall of the duct, and does not direct sound waves directly laterally of the cab. The sound level for the operator is also reduced by directing the sounds to locations remote from the cab.

DETAILED DESCRIPTION OF THE ILLUSTRATIVE EMBODIMENTS

Figure 1:
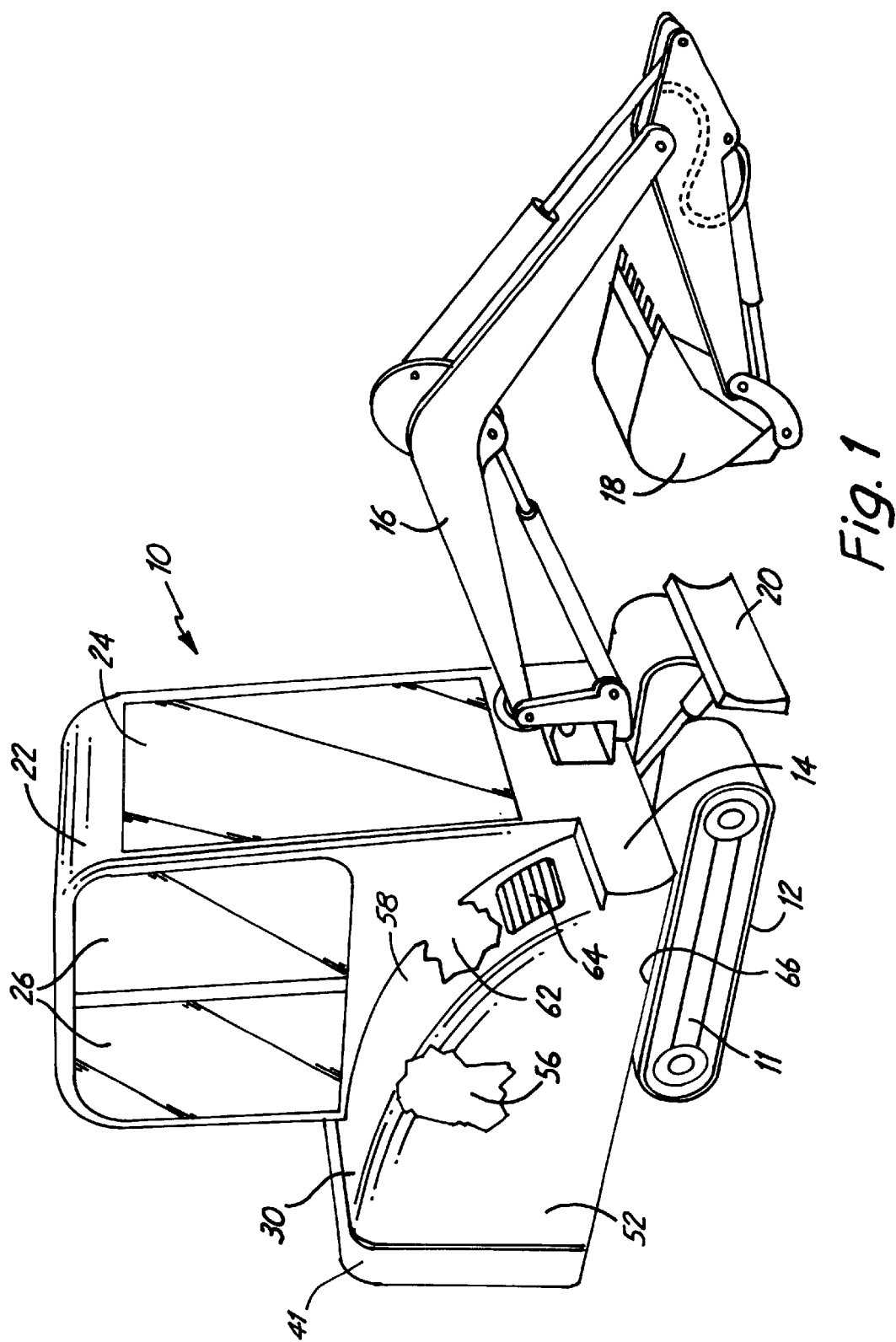
FIG. 1 is a perspective view of an excavator utilizing intake air ducting made according to the present invention.
Figure 2:
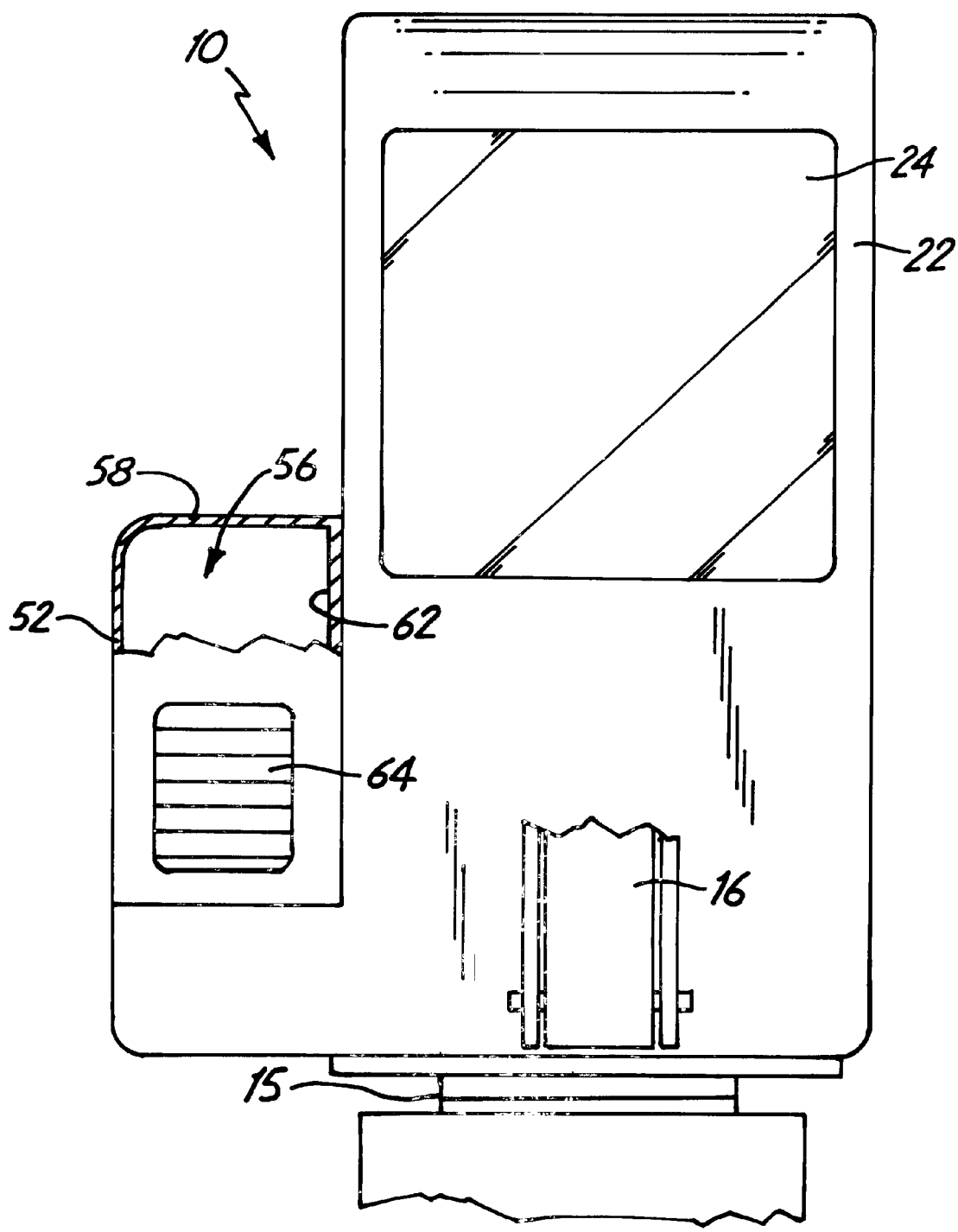
FIG. 2 is a front view of the excavator of FIG. 1 with pars in section and parts broken away.

A mini-excavator illustrated generally at 10 has an undercarriage or frame 11 that includes drive tracks 12 that propel the unit across the ground. The excavator has a base or platform mounted on a rotatable ring gear drive 15 selective to the under carriage 14 on which a boom assembly 16 is mounted. The boom assembly 16 has a bucket 18 at its outer end that is used for excavating in a normal manner and a dozer blade 20 can be provided.

The platform 14 supports an operator's cab 22 that has a transparent front panel 24 for enabling the operator to view the boom 16 during operation. The cab also has side windows 26.

Figure 3:
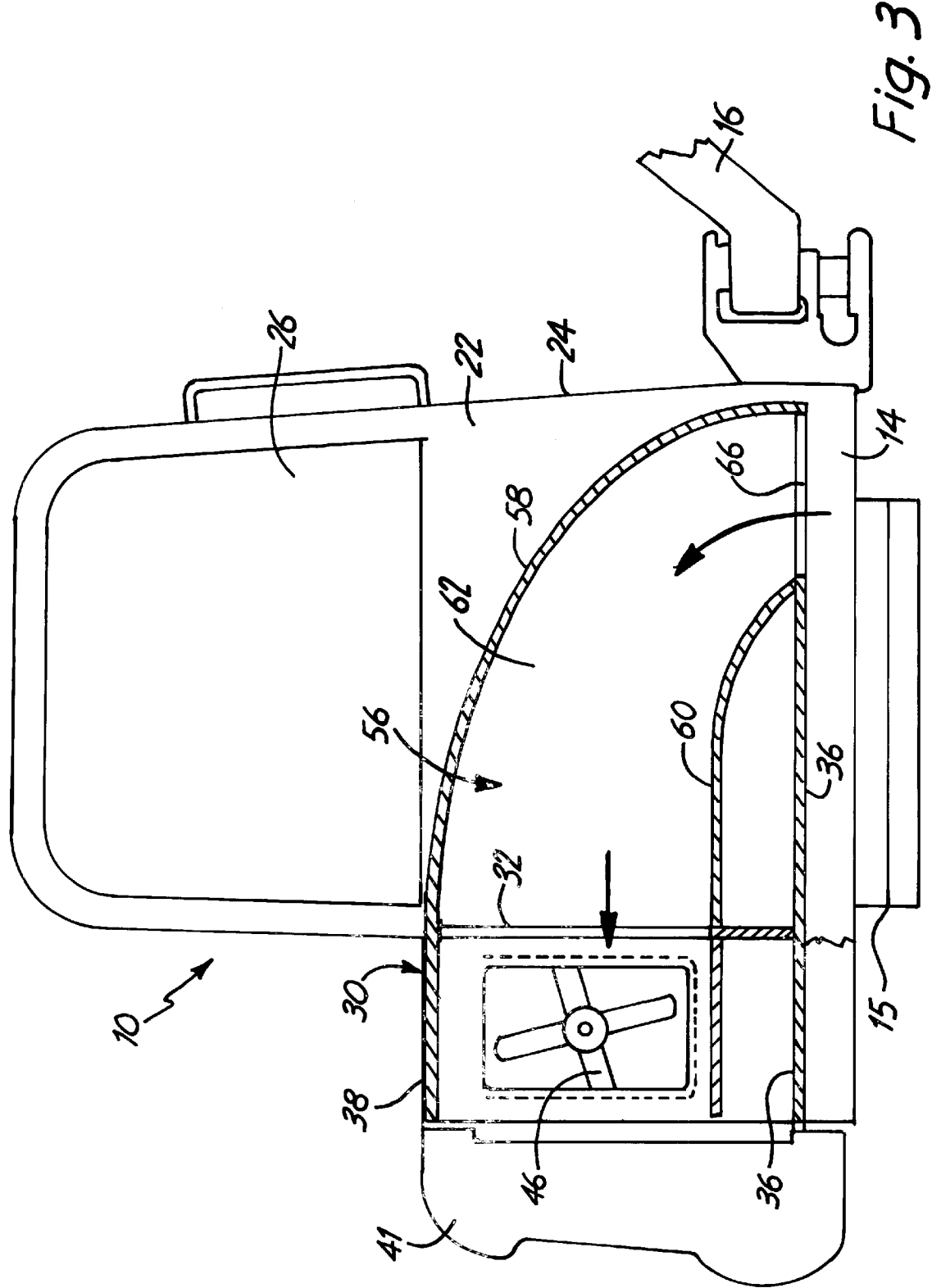
FIG. 3 is a side elevational view with parts of the excavator of FIG. 1 with parts in section and parts broken away.
Figure 4:
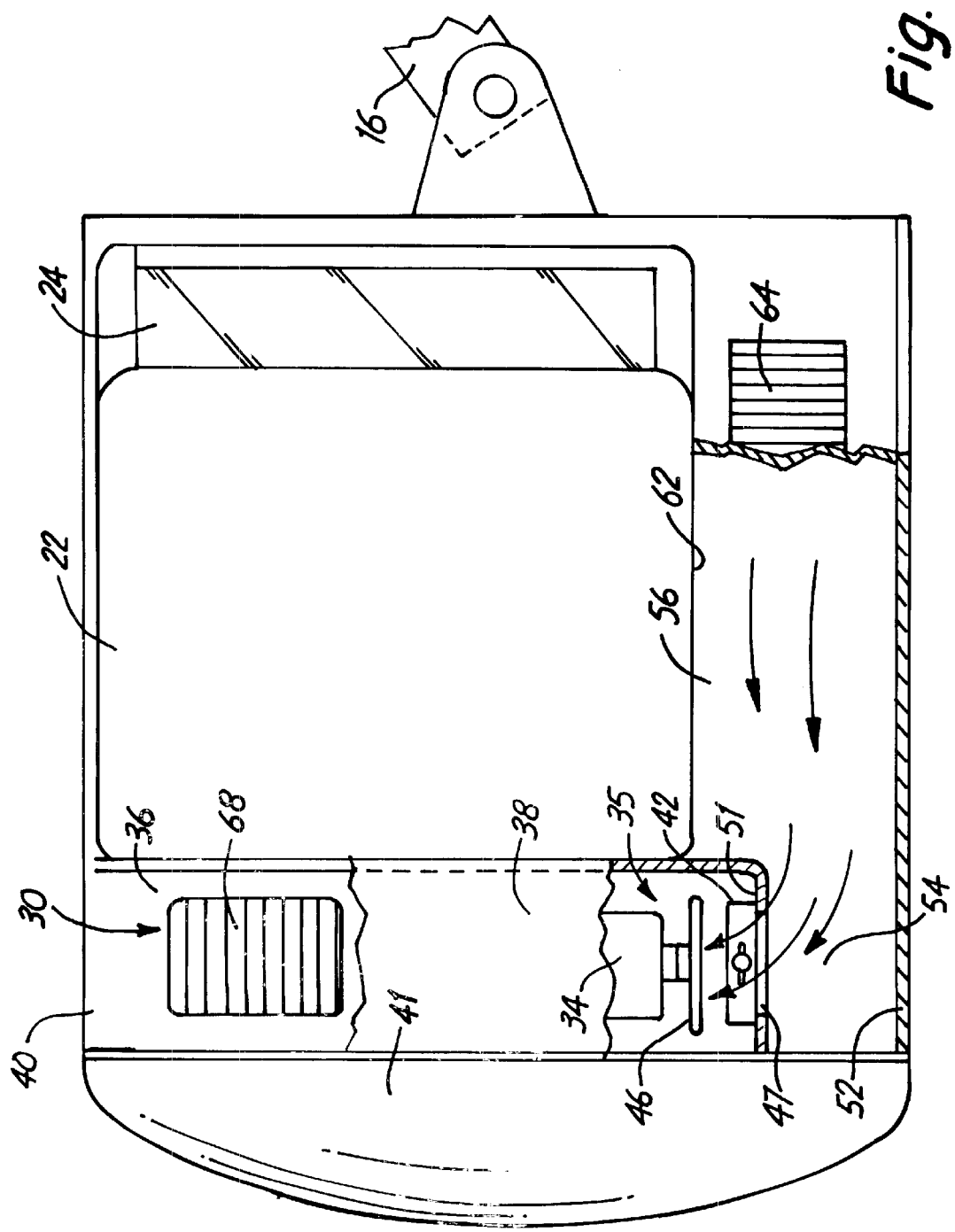
FIG. 4 is a top plan view with parts in section and parts broken away.
Figure 5:
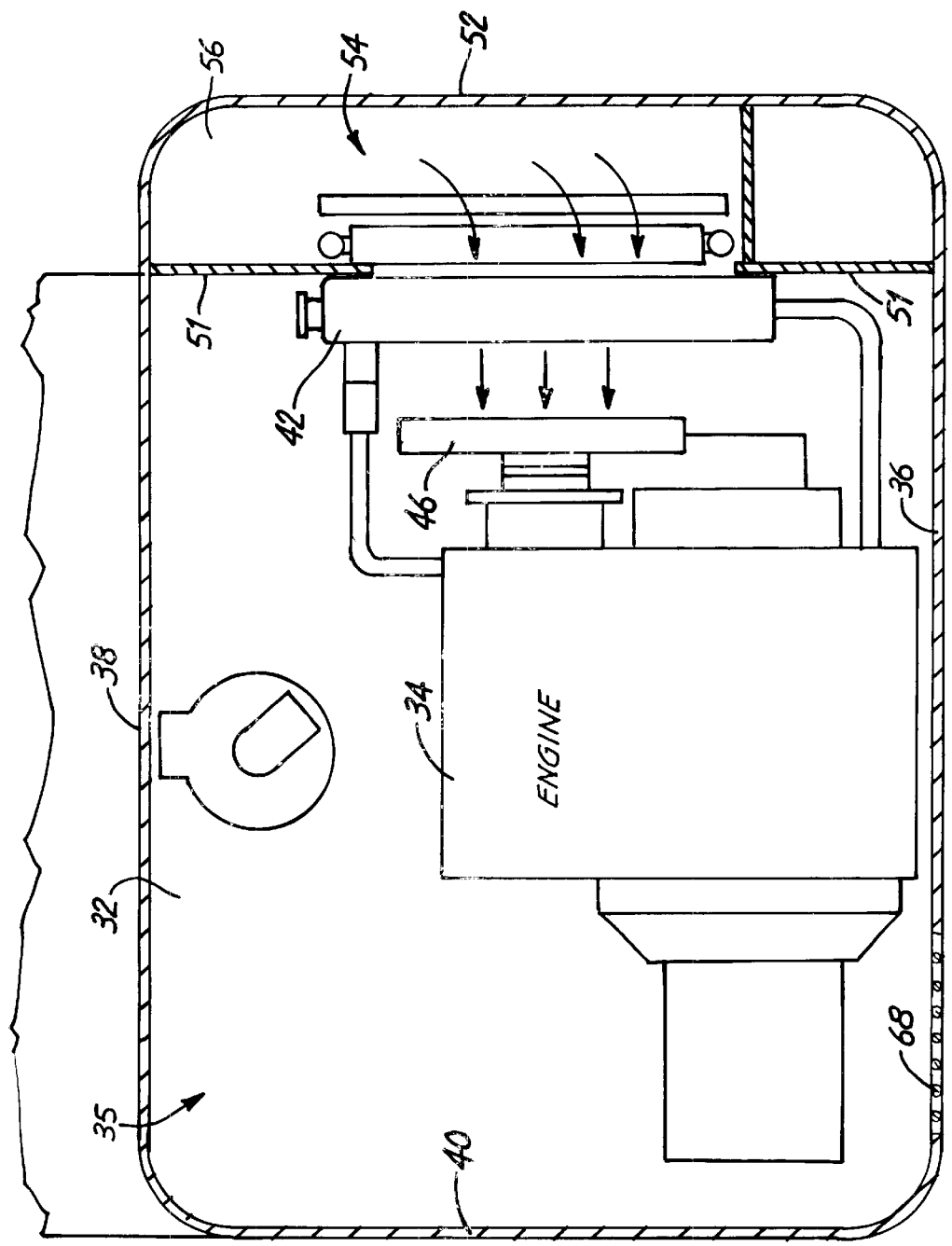
FIG. 5 is a sectional view taken as in line 5—5 in FIG. 3.

An engine compartment 30 is at the rear of the cab 22 and moves with the cab. As shown in FIGS. 3 and 5 for example, the engine compartment 30 is divided from the operator's cab 22 with a suitable wall 32. The engine compartment 30 houses an engine 34 of conventional design, which is shown as an internal combustion engine. The engine 34 is inside the compartment 30. The engine compartment 30 forms an enclosed chamber 35 with a bottom wall 36 that is positioned just above the base, and an upper wall 38 as well as a sidewall 40. A tailgate 41 is hinged to the wall 40 and can be opened for receiving the engine and components in chamber 35.

The engine 34 requires cooling, and the cooling passageways of the engine are connected to a conventional liquid-air heat exchanger or radiator 42 in a conventional manner. The radiator 42 is mounted adjacent one side of the engine compartment 30, and to the lateral side of the cab 22. A hydraulic oil cooler or radiator 44 also is mounted in front of the engine radiator 42. A fan 46 is mounted on the engine 34 in a conventional manner and provides airflow in the direction as indicated by arrows 48 through an opening 47 in the vertical side wall 51 of the engine compartment and through the oil cooler 44 and the radiator 42 in a conventional manner. The side wall 51 forms a baffle for containing and directing in flowing air.

A wall 52 is spaced laterally from wall 51 to form an inlet air chamber 54. The hydraulic oil cooler 44 can protrude into the inlet air chamber, but air has to flow through the hydraulic oil cooler 44 from the chamber 54 and then through the radiator 42 when the fan 46 is drawing air.

The inlet air chamber 54 is part of or connects to a cooling inlet air duct 56, that as shown has a curved top wall 58 that joins a side wall 52. The wall 52 extends forwardly from chamber 54 to form duct 56. The cooling air duct 56 is formed on the inner side with a wall 62 that joins wall 51 and which also forms a sidewall of the operator's cab 22, and a bottom wall 60 can be provided. The duct 56 provides a passageway for cooling air to flow from a selected one or more as inlet openings. For example an inlet opening 64 can be provided in the lower portions of the curved wall 58. The opening 64 faces forwardly in a general direction toward the boom 16. As shown in FIG. 3 the bottom wall 36 of the cab that is supported on the base can have an opening 66 that opens or faces downwardly. The wall 60 can be eliminated, and the bottom of duct 56 can be defined by wall 36, if desired.

Incoming air will flow upwardly through the opening 66 into the duct 56. The opening 66 faces downwardly, which again is away from positions where a person may stand when observing the operation of the excavator. Sound waves emanating from either opening 64 or 66 will be directed to regions where it is not likely that people will be standing close by, and in direction away from the operation.

The cooling airflow generated by the fan 46 is discharged through bottom openings of the engine compartment such as that shown at 68 in FIG. 5. The opening 68 is through the bottom wall 36.

As can be seen, the air inlet openings 64 or 66 are not directly aligned with the opening 47 in wall 51 where the radiator 42 and the oil heat exchanger 44 are mounted. Wall 52 that aligns with the opening in wall 51 leading to the engine compartment forms a sound baffle. Sound waves from the engine compartment and fan will rebound, rather than be emitted directly into the atmosphere. The sound waves must then turn the corner to go forwardly in order to be heard through the opening 64 and 66. The inlet air coming into the either opening 64 or 66 flows through the duct 56 formed by the curved wall 58 and the sidewalls 60 and 62 and provides airflow rearwardly. The incoming air has to turn the corner at chamber 54 as well, so that the noise generated by the incoming air is also reduced.

The relocation of the inflow air duct to provide intakes remote from the engine compartment opening mounting the radiator and oil cooler results in a reduction in the noise level from the in rushing air because of the turning of the air around the corner. Yet, the airflow is not impeded. An adequate, cooling air inflow is achieved with the fan 46.

The concept of having the openings for the inlet air remote from the engine compartment opening, and also positioned so that the emitted sound and inbound airflow have to turn a 90° corner to pass through the radiators results in a substantial reduction of the noise that is heard by the operator and by persons in the vicinity.

Although the present invention has been described with reference to preferred embodiments, workers skilled in the art will recognize that changes may be made in form and detail without departing from the spirit and scope of the invention.

What is claimed is:

1. An excavator having a frame, a platform mounted on the frame, the platform supporting a cab and the platform having a front end and a rear end, an engine compartment located to the rear of the cab and supported on the platform, the engine compartment having upright walls adjacent the rear end of the platform defining an enclosure, the upright walls including a side wall having a plane, an air inlet opening formed in the side wall and facing in a first sideways direction, an enclosed duct connected to the air inlet and extending forwardly along a portion of the side wall of the cab to a remote location at the front end of the platform and said duct being open to atmosphere al the remote location so that air flowing into the engine compartment enters the duct at a remote opening to the duct, which is remote from the air inlet opening in the engine compartment, said duct including a duct wall parallel to and spaced from the side wall and extending across the air inlet opening of the engine compartment and in registry therewith, said duct wall being parallel to a plane of the opening, and an end wall extending from the duct wall to the side wall on an opposite side of the air inlet opening from the remote opening so that air flowing through the duct from the remote opening along the duct wall turns substantially 90° to enter the air inlet opening of the engine compartment, a fan in the engine compartment, a radiator between the fan and the opening, and an air outlet in a bottom wall of the engine compartment spaced from the air inlet opening.

2. The air ducting system of claim 1, wherein said remote opening to the duct faces generally forwardly.

3. The air ducting system of claim 1, wherein the remote opening to the duct faces downwardly through the platform.

4. The air ducting system of claim 1, wherein said duct is defined by an upper wall that is curved from a maximum height adjacent the opening to the engine compartment forwardly to a minimum height adjacent the platform at the front end of the platform.

\* \* \* \* \*

UNITED STATES PATENT AND TRADEMARK OFFICE
CERTIFICATE OF CORRECTION

PATENT NO. : 6,431,299 B1
DATED : August 13, 2002
INVENTOR(S) : Asche et al.

It is certified that error appears in the above-identified patent and that said Letters Patent is hereby corrected as shown below:

Column 4,
Line 14, "al" should be -- at --.

Signed and Sealed this

First Day of July, 2003

JAMES E. ROGAN
*Director of the United States Patent and Trademark Office*